(12) United States Patent
Kim

(10) Patent No.: US 11,629,038 B2
(45) Date of Patent: Apr. 18, 2023

(54) FORKLIFT CABIN DOOR AND WINDOW FRAME TO BE MOUNTED WITHOUT DRILLING OPERATION

(71) Applicant: Hak Sung Kim, Incheon (KR)

(72) Inventor: Hak Sung Kim, Incheon (KR)

( * ) Notice: Subject to any disclaimer, the term of this patent is extended or adjusted under 35 U.S.C. 154(b) by 463 days.

(21) Appl. No.: 17/043,568

(22) PCT Filed: Mar. 26, 2019

(86) PCT No.: PCT/KR2019/003471
§ 371 (c)(1),
(2) Date: Dec. 14, 2020

(87) PCT Pub. No.: WO2019/190148
PCT Pub. Date: Oct. 3, 2019

(65) Prior Publication Data
US 2021/0107775 A1    Apr. 15, 2021

(30) Foreign Application Priority Data

Mar. 29, 2018  (KR) .......................... 10-2018-0036915

(51) Int. Cl.
*B66F 9/075*           (2006.01)
(52) U.S. Cl.
CPC ........ *B66F 9/0759* (2013.01); *B66F 9/07513* (2013.01); *B60Y 2200/15* (2013.01); *B66F 9/07504* (2013.01)
(58) Field of Classification Search
CPC ................ B66F 9/0759; B66F 9/07513; B66F 9/07504; B60Y 2200/15
See application file for complete search history.

(56) References Cited

U.S. PATENT DOCUMENTS

| | | | | |
|---|---|---|---|---|
| 4,957,324 A | * | 9/1990 | Doescher | .............. E02F 9/0833 296/190.11 |
| D348,553 S | * | 7/1994 | Martin, Jr. | ..................... D34/37 |

(Continued)

FOREIGN PATENT DOCUMENTS

| | | |
|---|---|---|
| JP | 06-048065 Y2 | 12/1994 |
| JP | 11-002058 A | 1/1999 |

(Continued)

*Primary Examiner* — Michael A Riegelman
(74) *Attorney, Agent, or Firm* — Maschoff Brennan

(57) ABSTRACT

The present invention relates to a forklift capable of mounting a door in a state in which a pipe for forming a cabin frame is not drilled, the forklift having: a door mounting bar, which is mounted on the outer surfaces of rear pipes at both left and right surfaces of the cabin frame of the forklift, has a bent part formed at the upper end thereof, and has a fastening part formed on one side surface thereof by bending so as to be positioned at the rear surface of the rear pipe; a rear window frame which is mounted between both the left and right rear pipes at the rear of the cabin frame and is formed as a square frame having, at both the left and right sides thereof, engagement fastening parts coupled to the fastening part of the door mounting bar; connecting brackets which simultaneously fasten the door mounting bar and the rear window frame while coming in close contact with the rear pipe at the inner side of the cabin frame; and a hinge bracket which is provided at the upper and lower ends of the outer surface of the door mounting bar, is integrally provided with threads so as to ensure the thread thickness of bolt fastening for the assembly of a hinge for opening and closing the door, and has a predetermined thickness.

8 Claims, 13 Drawing Sheets

(56) References Cited

U.S. PATENT DOCUMENTS

| | | | | |
|---|---|---|---|---|
| 6,128,861 | A * | 10/2000 | Calamari | E06B 7/2309 |
| | | | | 49/501 |
| 6,149,228 | A * | 11/2000 | O'Neill | B62D 33/0621 |
| | | | | 296/190.08 |
| 6,293,610 | B1 * | 9/2001 | Howard | A63B 55/60 |
| | | | | 180/908 |
| 6,561,572 | B1 * | 5/2003 | Martin, Jr. | B62D 33/0621 |
| | | | | 296/190.11 |
| D577,040 | S * | 9/2008 | Kim | D15/30 |
| 7,731,273 | B2 * | 6/2010 | Hagele | E02F 9/163 |
| | | | | 296/190.08 |
| 8,496,282 | B2 * | 7/2013 | Murakami | E05B 1/0015 |
| | | | | 296/65.05 |
| D691,924 | S * | 10/2013 | Smith | D12/96 |
| 11,376,929 | B2 * | 7/2022 | Pennings | E05B 83/36 |
| 11,541,729 | B2 * | 1/2023 | Toyota | B60R 13/0237 |
| 2009/0033105 | A1 * | 2/2009 | Antonetti | E05C 17/025 |
| | | | | 292/216 |
| 2021/0107775 | A1 * | 4/2021 | Kim | B66F 9/0759 |
| 2021/0170841 | A1 * | 6/2021 | Pennings | E05C 17/025 |
| 2021/0246705 | A1 * | 8/2021 | Kato | E05F 15/48 |

FOREIGN PATENT DOCUMENTS

| | | |
|---|---|---|
| KR | 20-1993-0006699 U | 4/1993 |
| KR | 20-1999-0006639 U | 8/1999 |
| KR | 10-0728839 B1 | 6/2007 |
| KR | 10-2012-0007344 A | 1/2012 |

\* cited by examiner

[FIG. 1]
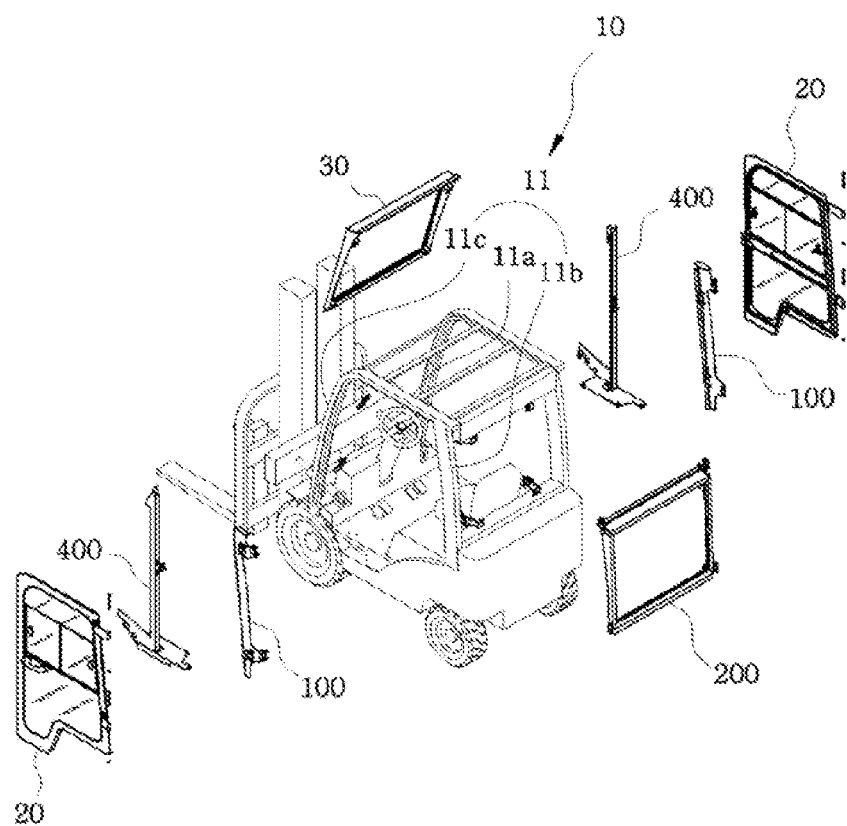

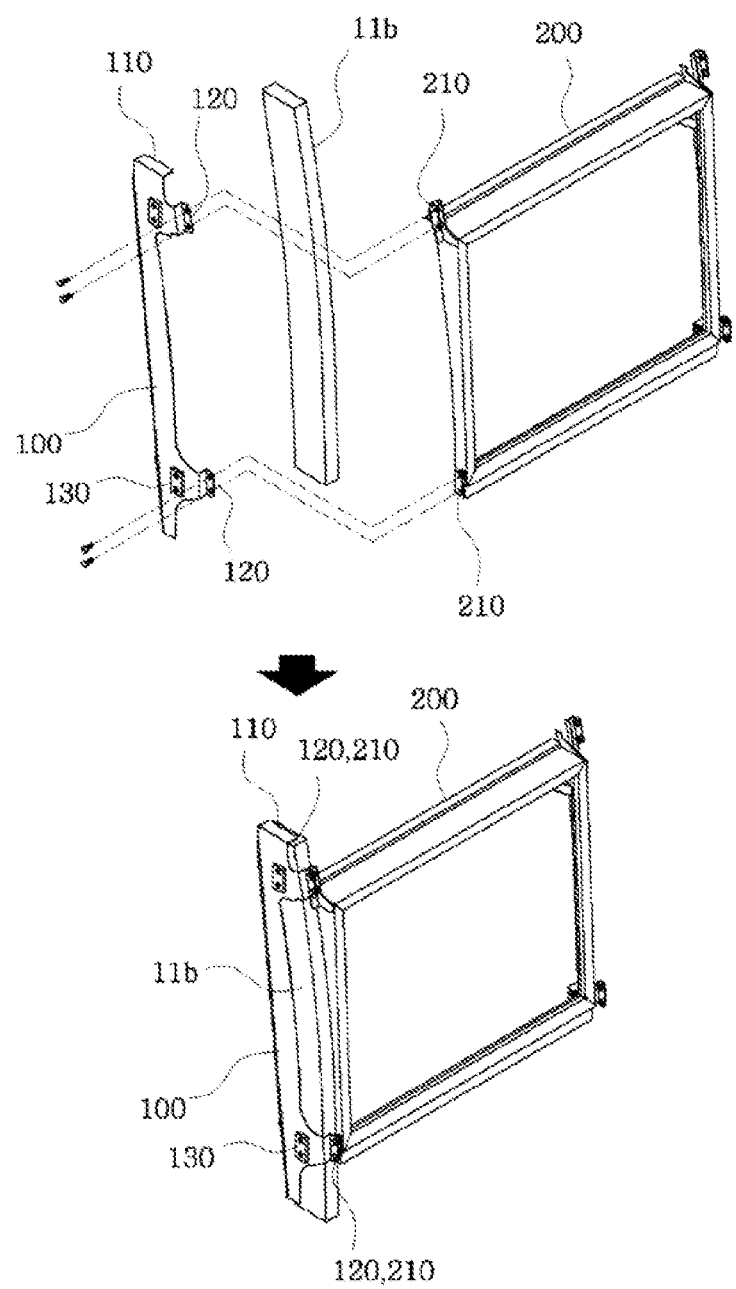
[FIG. 2]

[FIG. 3]
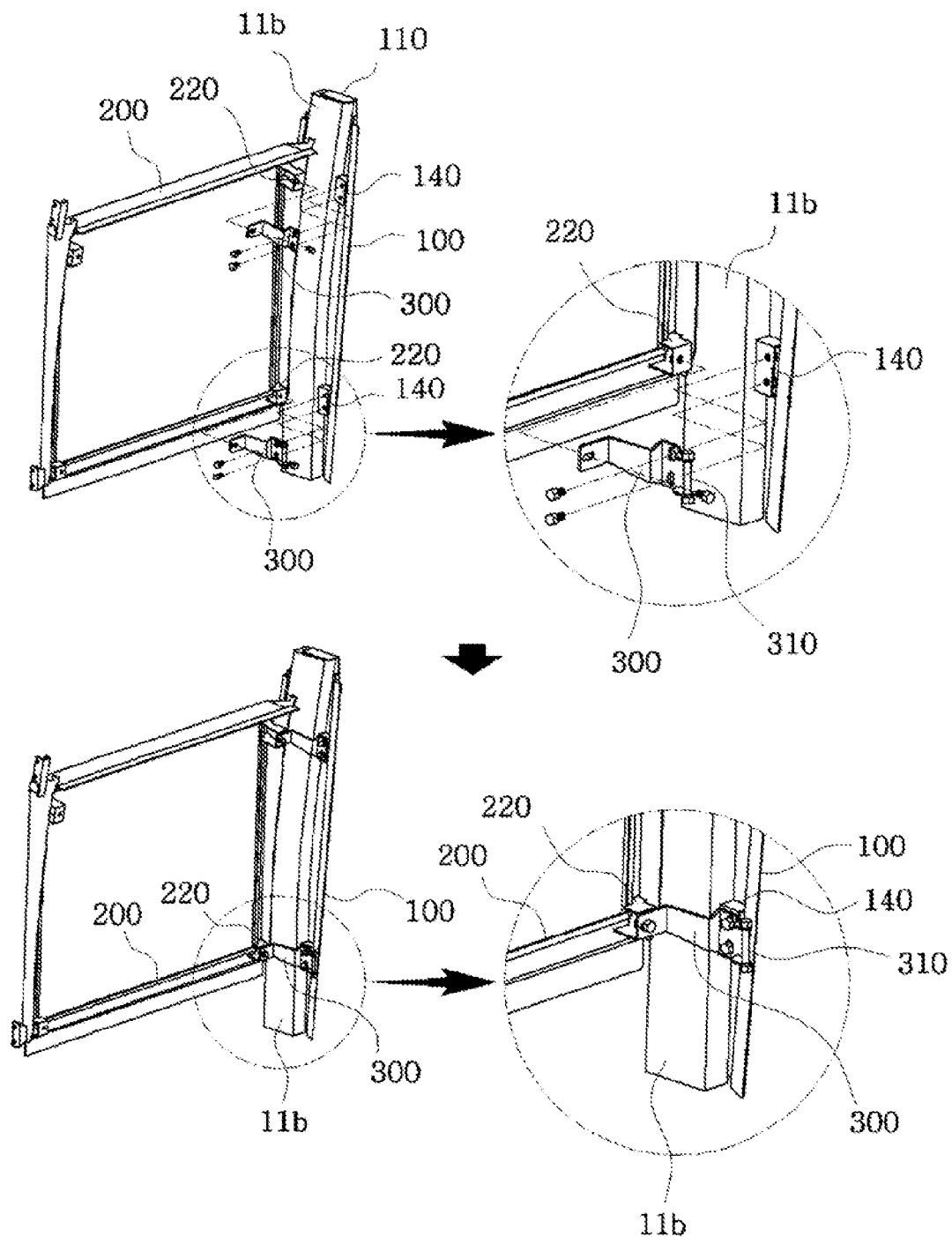

[FIG. 4]
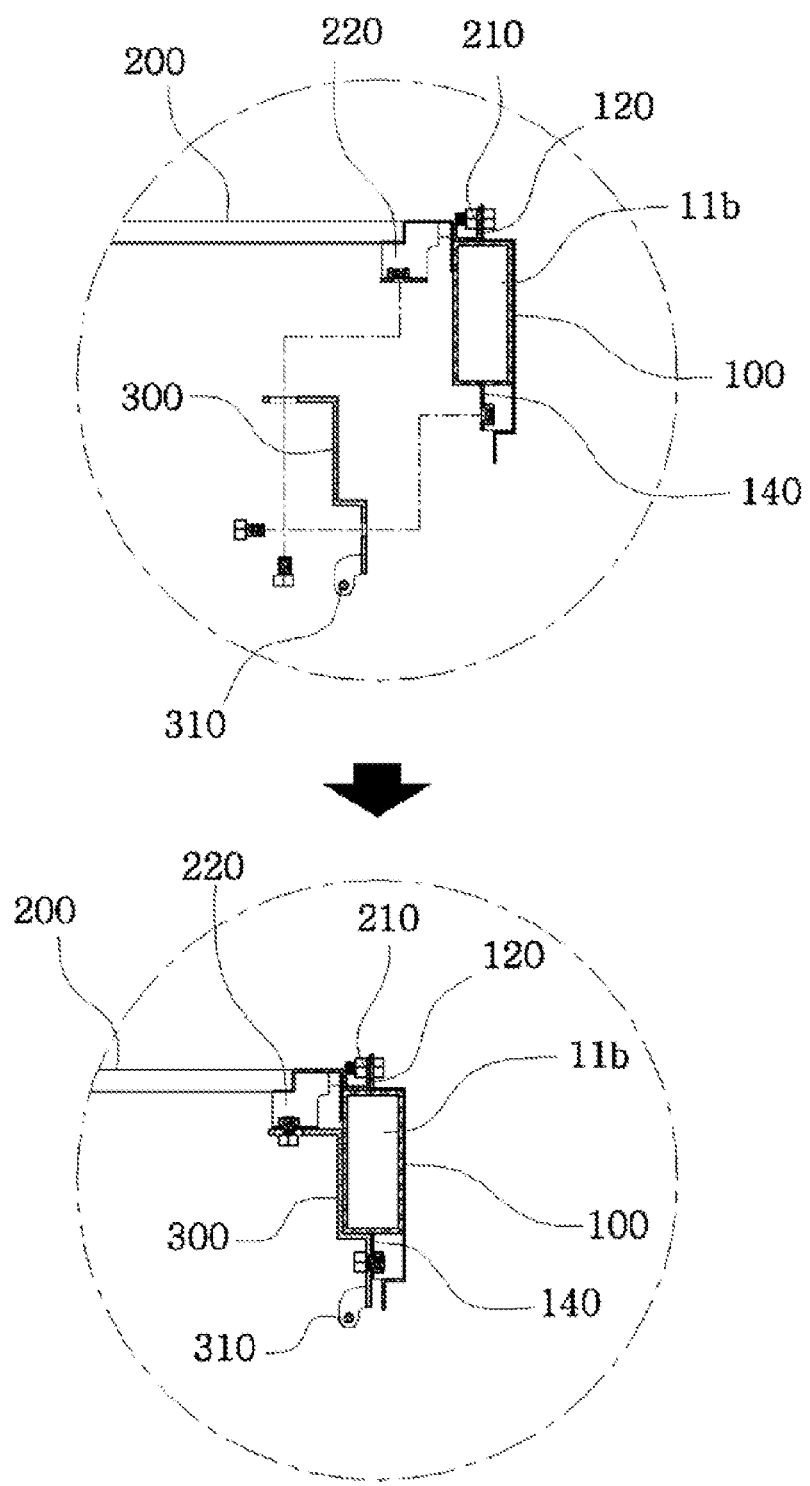

[FIG. 5]
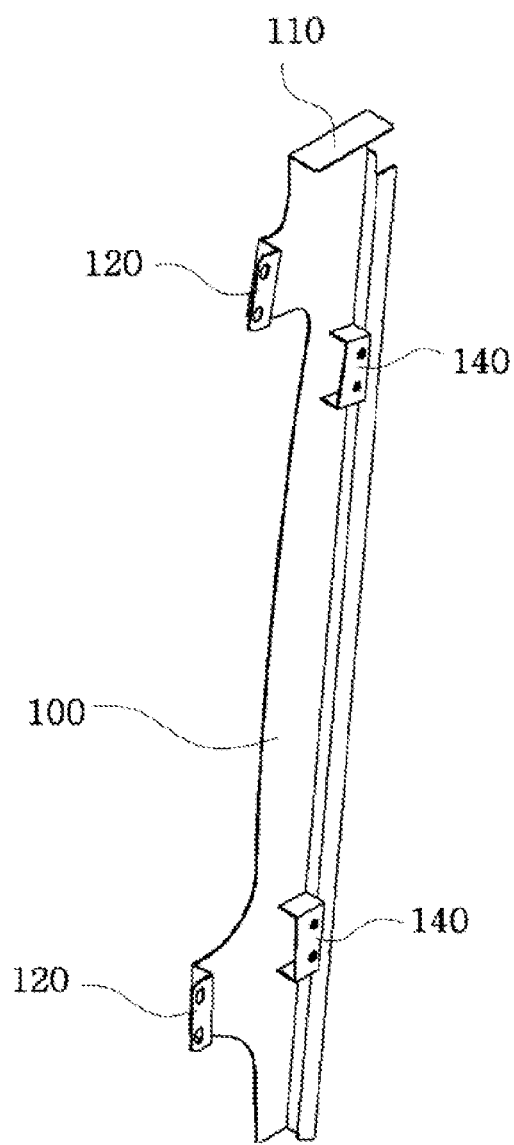

[FIG. 6]
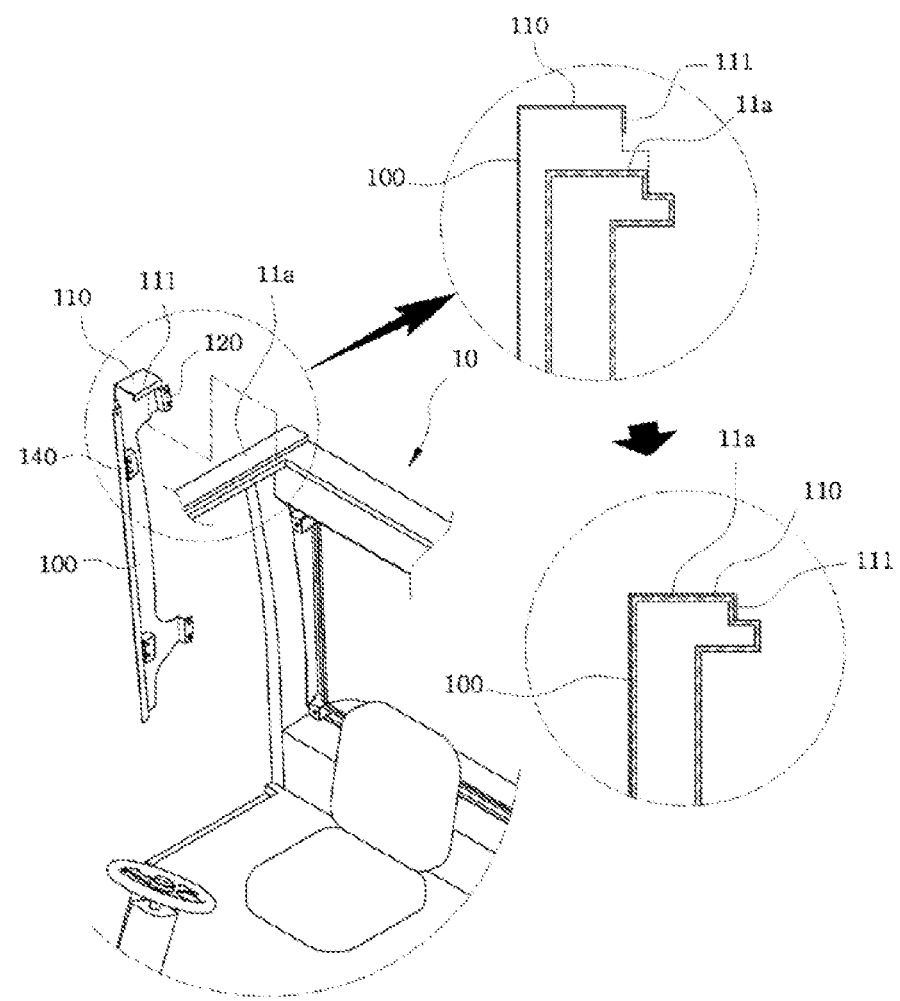

[FIG. 7]
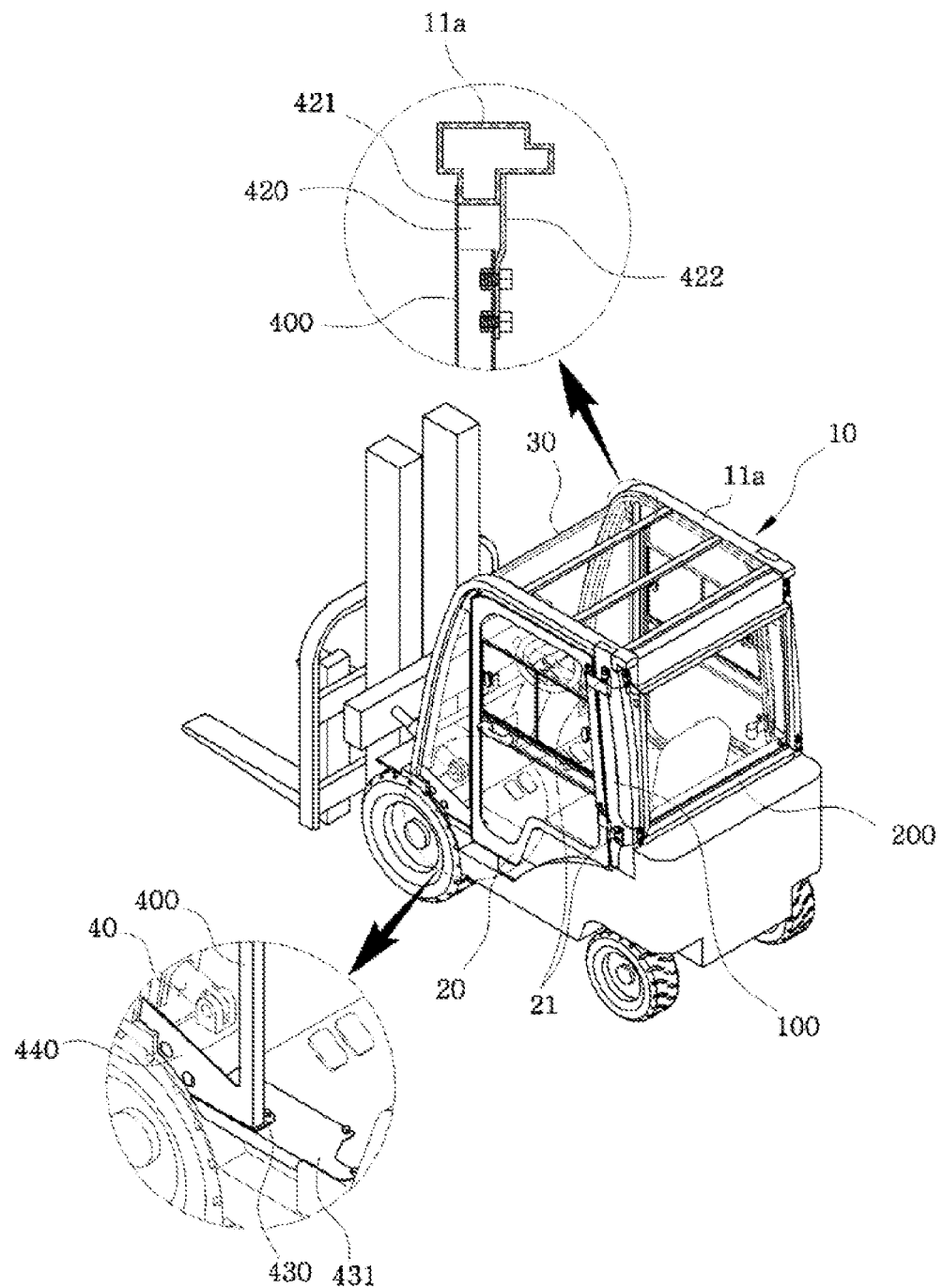

[FIG. 8]
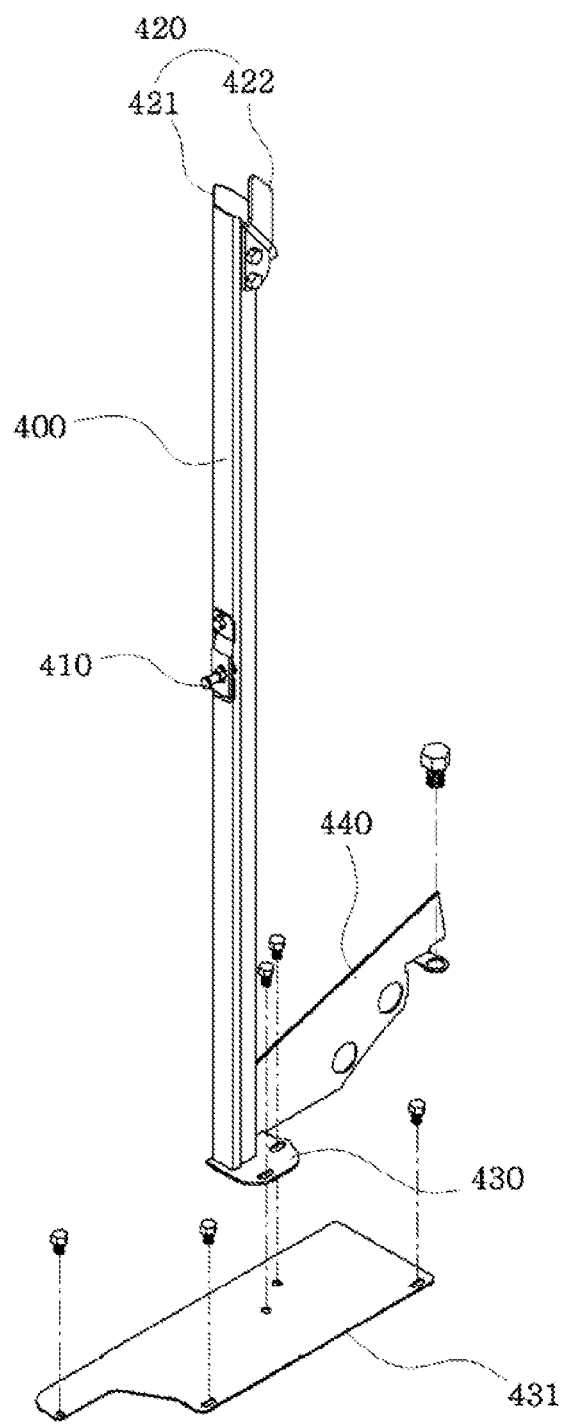

[FIG. 9]
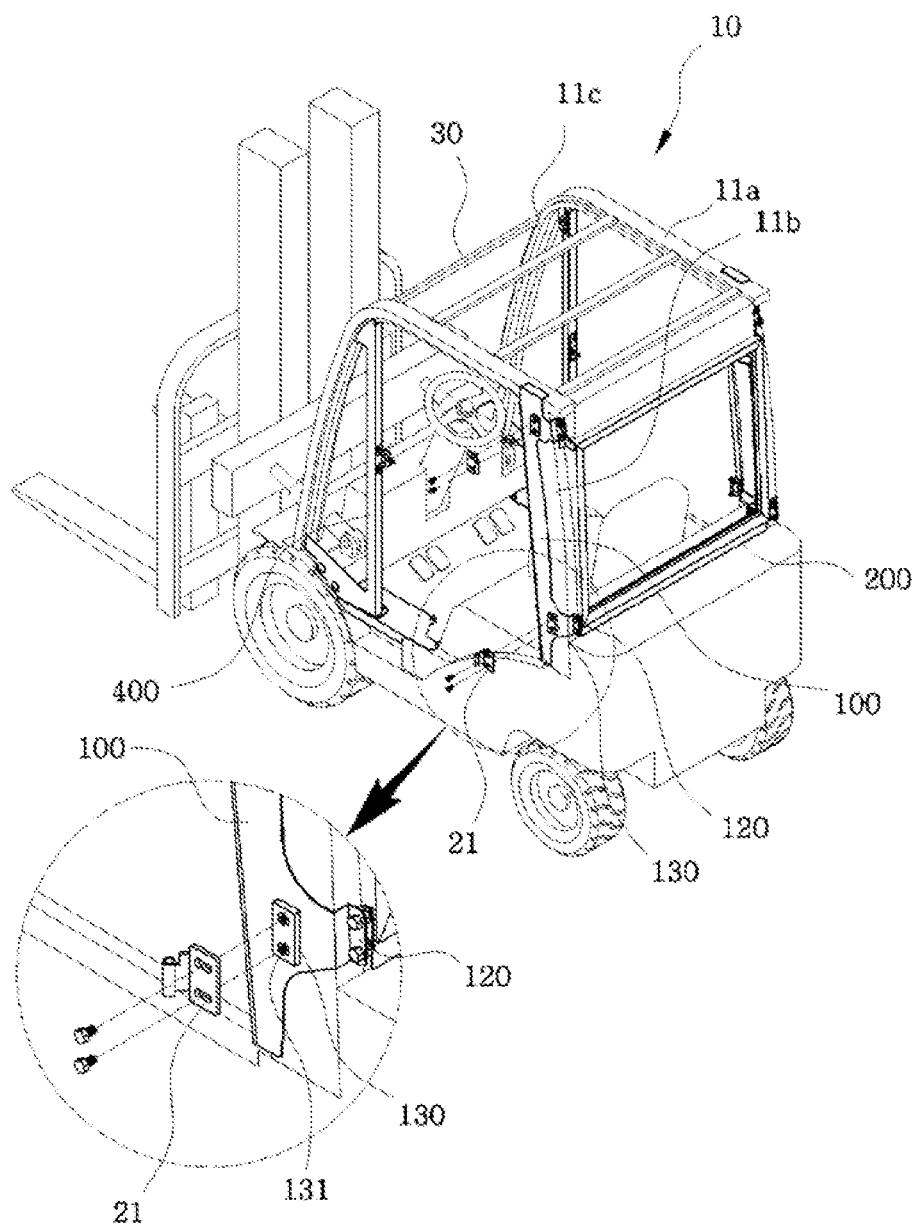

[FIG. 10]
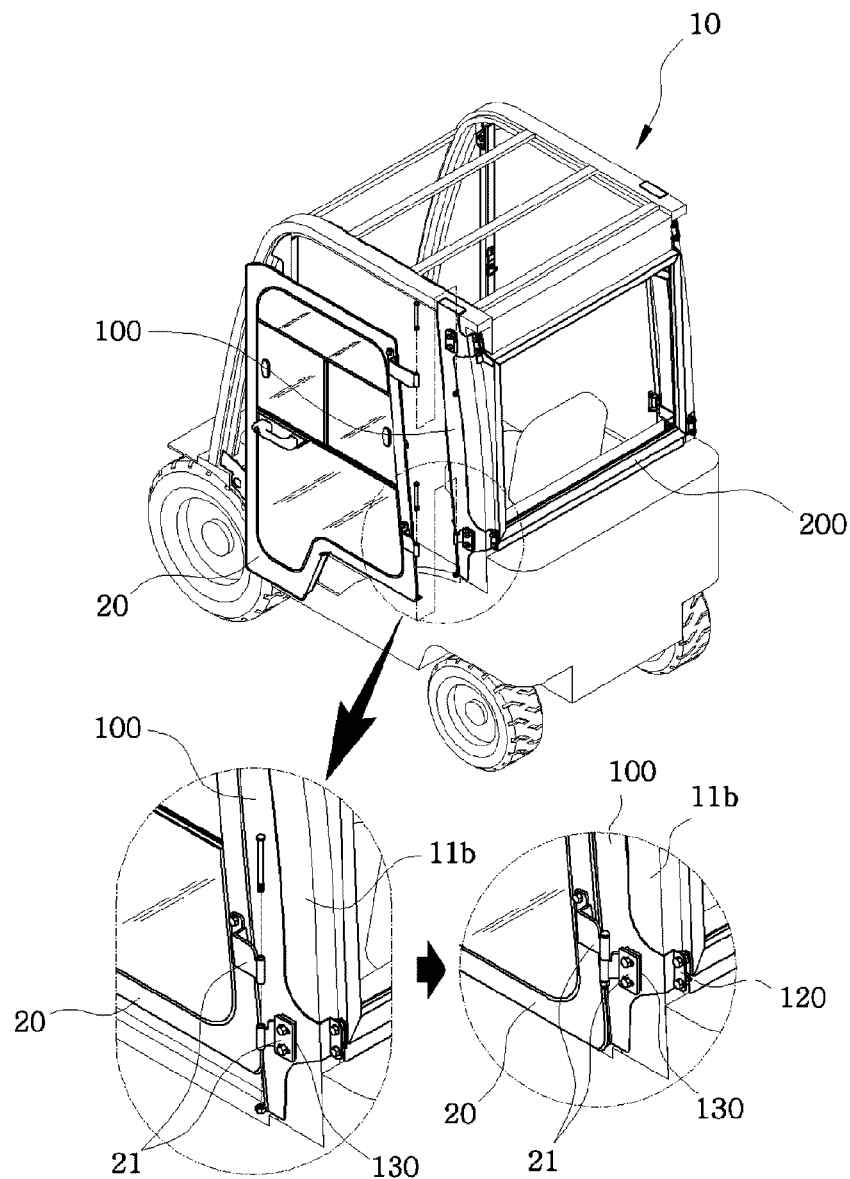

[FIG. 11]
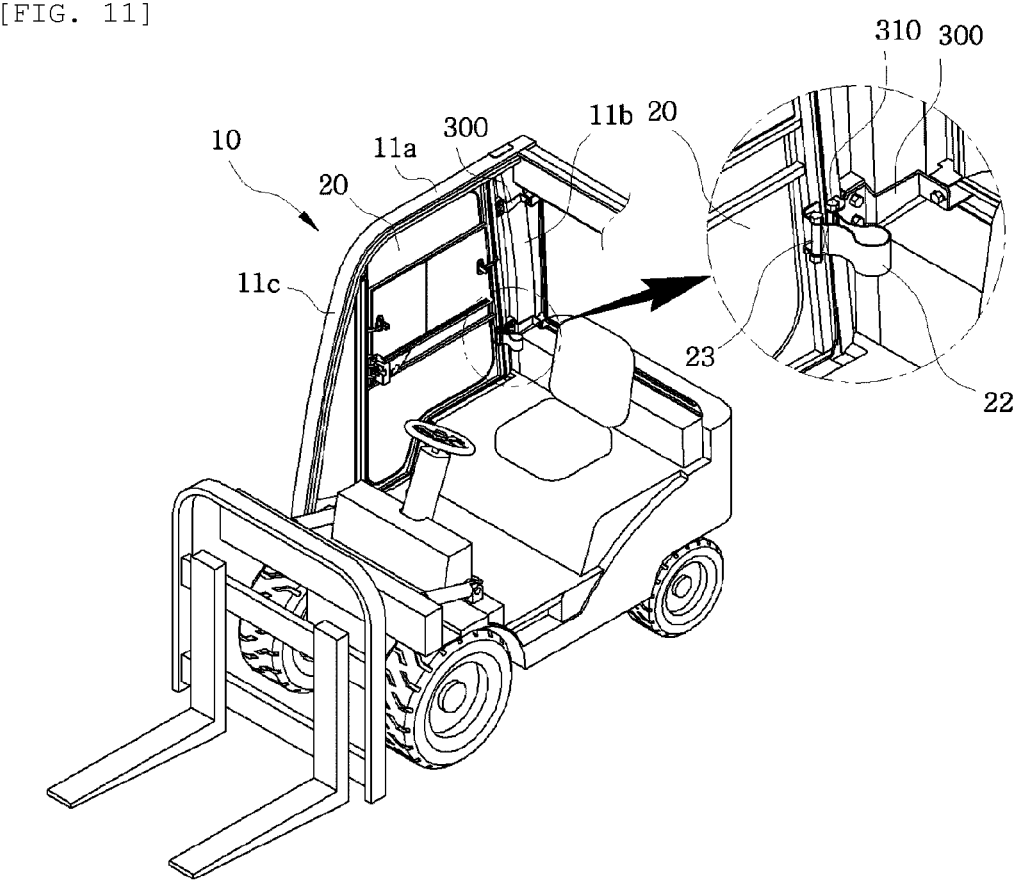

[FIG. 12]
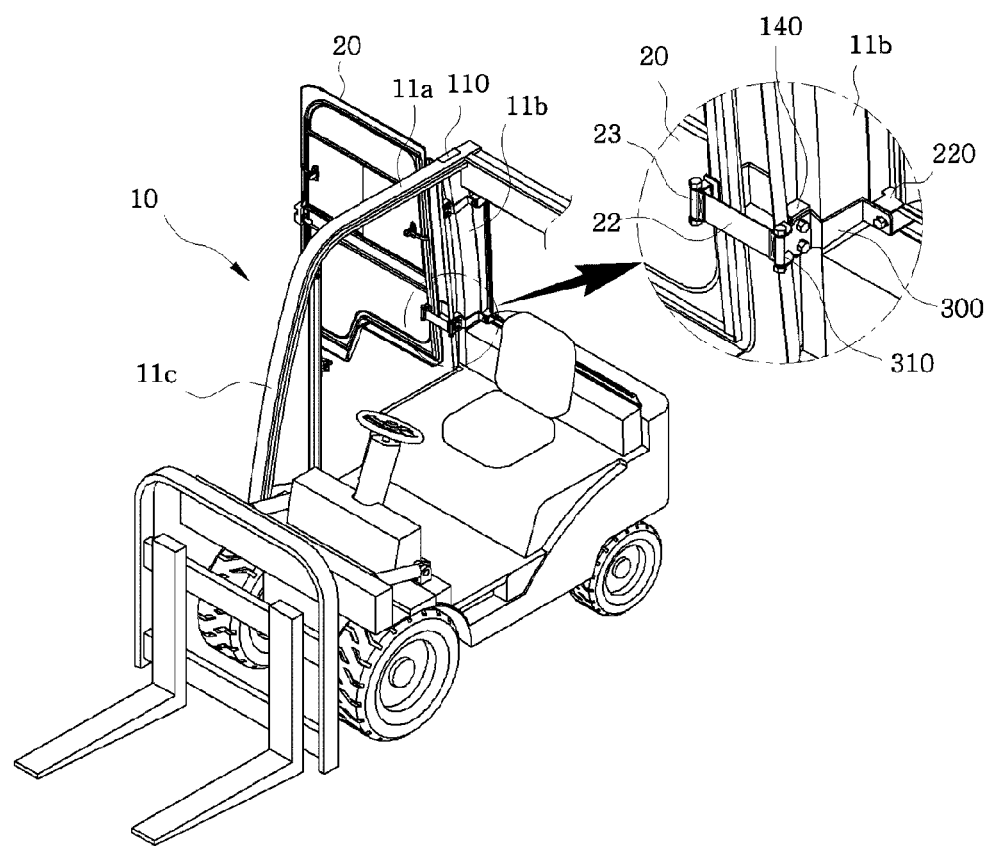

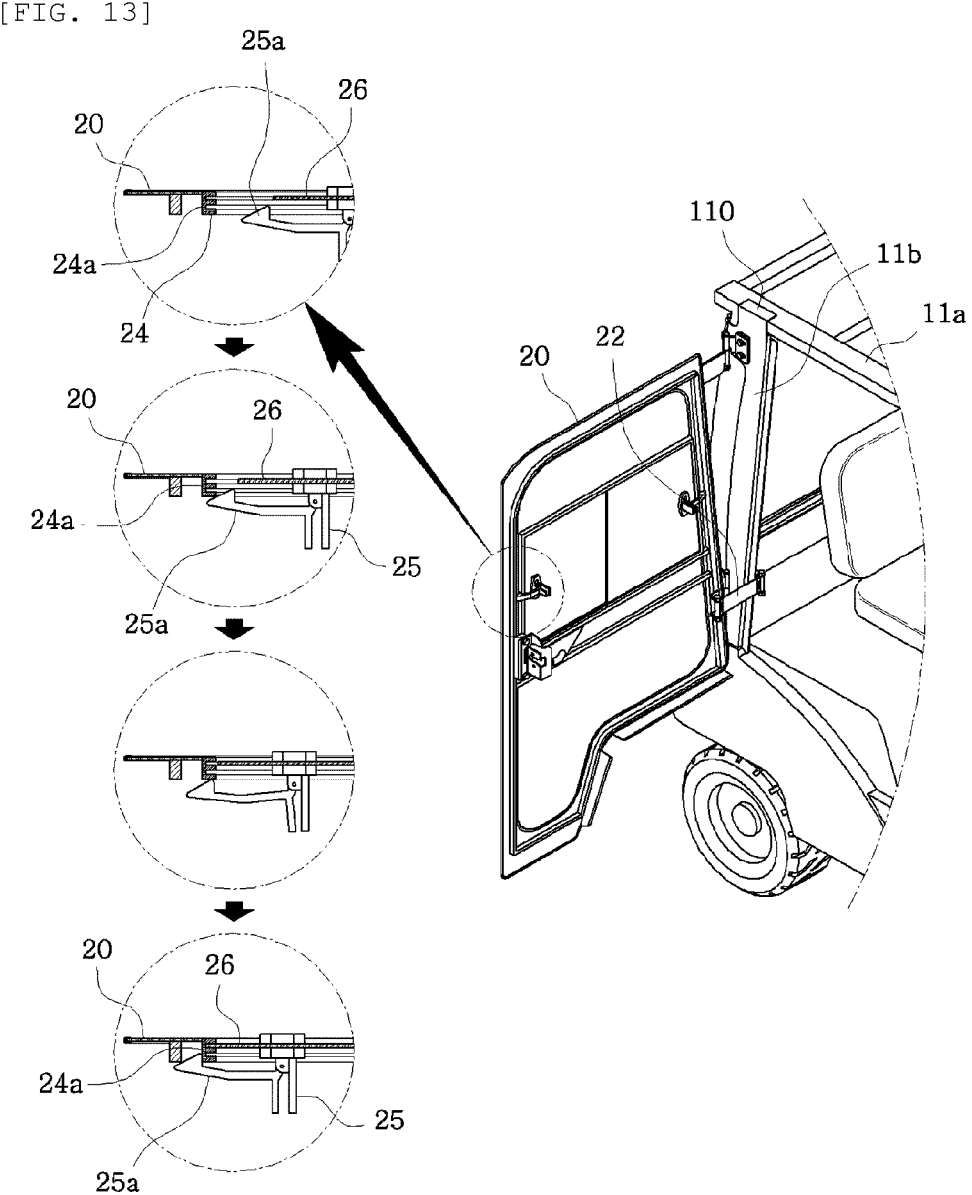
[FIG. 13]

FORKLIFT CABIN DOOR AND WINDOW FRAME TO BE MOUNTED WITHOUT DRILLING OPERATION

FIELD OF INVENTION

The present invention relates to a door and a window frame mounted on a cabin of a forklift, which can be mounted on a pipe to construct a framework of the cabin without drilling operation.

BACKGROUND OF INVENTION

Currently, a forklift cabin uses hollow pipes to form a framework of the cabin, and these pipes are usually formed in a polygonal (square) shape and are manufactured such that different electric wirings used for driving the forklift are embedded in the pipe without being exposed to the outside.

Further, the forklift includes hard type doors mounted at left and right sides as well as front and rear windows in order to improve boarding efficiency in cloudy and rainy days and in cold winter or hot summer, wherein the front and rear windows and the doors can be opened or closed for ventilation of the inside of the forklift.

Therefore, when doors are mounted at the left and right sides of a hollow pipe, hinge means are installed for folding the doors. In this case, when welding is performed while the wirings are embedded, there is a problem such as melting of wires due to welding heat. Therefore, the hinge means is mostly fixed by perforating a bolt hole possibly screw-fastened through drilling and then fastening a bolt in a thread formed in the above bolt hole.

However, in such case, when the drill penetrates the pipe and touches a coated wire to cause fine damage to the wire by a person inexperienced or even skilled for drilling operation, some problems may occur during driving. Further, if the wires are touched during drilling, significant problems such as a risk of fire may also be caused.

Further, when the hinge means is fastened with bolts, a minimum thickness of a screw thread formed for bolt fastening should be about 8 mm to secure a fixing force by thread tightening. However, the thicker the pipe used for a cabin frame, the higher a forklift manufacturing cost. In addition, as weight is increased, fuel efficiency is deteriorated. For such reasons, the above thickness is not adopted, hence causing a problem such as loosening of the fastened bolt.

Therefore, in order to prevent such loosening, an adhesive is typically applied to a fastening bolt. Such use of the adhesive entails a difficulty in separating and re-installing a door and a rear window due to the fixed bolt, since the door and the rear window are normally separated in the summer and then re-installed in the winter. In particular, as the seasons change, since a user frequently works in a state in which the door is mounted but opened, there may be a problem in that the fixed bolt is often wonky due to movement of the door and is loosened.

SUMMARY OF INVENTION

Technical Problem to be Solved

Therefore, the present invention has been designed to enable a hard door to be mounted on a pipe even without drilling and, in addition, to enable a front window and a rear window having an opening/closing function to be mounted without drilling and to be easily detached.

Technical Solution

In order to accomplish the above object, there is provided a forklift, including: a door mounting bar which is mounted on an outer surface of a rear pipe at each of left and right sides of a cabin frame, wherein a bent portion is formed on a top end of the door mounting bar, and a coupling part is bent and formed on one surface and located at the rear of the rear pipe; a rear window frame which is mounted between both left and right pipes at the rear of the cabin frame, and consists of a square frame wherein an engagement coupling part to be coupled to the above coupling part in the door mounting bar is formed at each of left and right sides of the square frame; a coupling bracket that simultaneously connects the door mounting bar and the window frame while coming into close contact with the rear pipes at an inner side of the cabin frame; and a hinge bracket provided at top and bottom ends of the outer surface of the door mounting bar, which has a predetermined thickness and is integrally formed with a thread in order to ensure a thread thickness at bolt fastening for assembly of a hinge to open/close a door.

Further, an extended bent portion, which is bent downward, is provided in the bent portion formed at the top end of the door mounting bar and is secured to enclose an upper pipe of the cabin, so as to support (or reinforce) mounting of the door mounting bar.

Further, the door mounting bar is attached by applying an adhesive to prevent the pipe of the cabin from loosening.

Effect of Invention

Therefore, according to the present invention, a door and a rear window to be opened/closed may be mounted on a pipe, in which different wirings of a cabin frame are installed, without drilling the pipe in order to mount the door and rear window thereon, thereby inhibiting damage to the wirings, so that malfunction of a forklift or fire can be prevented. Further, the present invention has effects of ease of manufacture and an advantage in that a normal person can easily operate for assembly and detachment of the door and rear window. In addition, in a state of being separated, no drilling hole exists, the forklift always maintains its original appearance, and corrosion such as rust due to a drilling process is prevented, resulting in provision of a high quality forklift.

BRIEF DESCRIPTION OF DRAWINGS

FIG. 1 is a perspective view illustrating a configuration of mounting a door on a forklift cabin frame according to an embodiment of the present invention.

FIG. 2 is one side perspective view illustrating assembly of a door mounting bar and a rear window frame on the cabin frame according to the present invention.

FIG. 3 is the other side perspective view illustrating assembly of a door mounting bar and a rear window frame on the cabin frame according to the present invention.

FIG. 4 is a cross-sectional view illustrating the assembly of the door mounting bar and the rear window frame according to the present invention.

FIG. 5 is a perspective view illustrating the door mounting bar according to the present invention.

FIG. 6 is a perspective view illustrating another mounting configuration of a door mounting bar according to the present invention.

FIG. 7 is a perspective view illustrating a vertical bar partitioning a door and a side window on a cabin frame according to the present invention.

FIG. 8 is a perspective view illustrating the vertical bar according to the present invention.

FIG. 9 is a perspective view illustrating a configuration of mounting a hinge on the door mounting bar according to the present invention.

FIG. 10 is a perspective view illustrating a configuration of mounting a door on the door mounting bar according to the present invention.

FIG. 11 and FIG. 12 illustrate operation of the door at intermittent opening angles according to the present invention.

FIG. 13 is a cross-sectional view illustrating operation of a locking means for a door window according to the present invention.

BEST MODE

A preferred embodiment of the present invention provides a forklift, including: a door mounting bar which has a hook part formed at a top end thereof to be caught on an upper pipe while coming into close contact with an outer surface of a rear pipe at each of left and right sides of a cabin frame, as well as a coupling part formed at one surface thereof to be disposed at the rear of the rear pipe;

a rear window frame which is mounted between both the left and right rear pipes at the rear of the cabin frame, and consists of a square frame wherein an engagement coupling part coupled to the above coupling part in the door mounting bar in a bolt fastening manner is formed at each of left and right sides of the square frame;

a coupling bracket that simultaneously connects the door mounting bar and the rear window frame, which are coupled in close contact with the outside of the rear pipe, at the inside of the cabin frame, thus preventing the door mounting bar and the rear window frame from being separated from the rear pipe; and a door, which is mounted on the door mounting bar and is opened and closed by a hinge, wherein a hinge bracket is provided at each of top and bottom ends of the outer surface of the door mounting bar, which has a predetermined thickness and is integrally formed with a thread in order to ensure a thread thickness at bolt fastening for assembly of the hinge to open/close the door.

DETAILED DESCRIPTION OF PREFERRED EMBODIMENTS OF INVENTION

Hereinafter, the present invention will be described in detail with reference to the accompanying drawings.

As shown in FIG. 1 to FIG. 6, the present invention provides a forklift driven by a drive device, including: a cabin frame 10 composed of a hollow polygonal pipe 11 at each of the left and right sides of the forklift, front and rear sides and the upper end of which are integrally connected together, and in which electric wirings are embedded, wherein the cabin frame forms a driver's seat where a user drives the forklift and operates a mast assembly provided with a carriage having a fork; a front window frame 30 mounted at the front of the cabin frame 10 by a front pipe 11c; a door mounting bar 100 mounted on a rear pipe 11b at each of left and right sides of the cabin frame; a rear window frame 200 consisting of a square frame, which is mounted between the rear pipes 11b of the cabin frame 10; a coupling bracket 300 for connecting the door mounting bar 100 and the rear window frame 200; and a door 20 mounted on the door mounting bar 100 to be opened/closed by a hinge 21, wherein a hinge bracket 130 is provided at each of top and bottom ends of the outer surface of the door mounting bar 100, which has a predetermined thickness and is integrally formed with a thread 131 in order to ensure a thread thickness at bolt fastening for assembly of the hinge 21 to open/close the door 20.

In this regard, the door mounting bar 100 may have a length corresponding to the rear pipe 11b of the cabin frame 10 and closely contact the outer surface thereof, wherein a hook part 110 is formed at a top end of the door mounting bar to be caught on an upper pipe 11a of the cabin frame 10, the coupling part 120 is formed at one surface to protrude backward while coming into close contact with a rear side of the rear pipe 11b, the rear window frame 200 is provided by connecting a plurality of frame bars at a predetermined length in an L-shape to form a square frame by means of welding and is disposed between the rear pipes 11b, and an engagement coupling part 210 engaged with the coupling part 120 of the door mounting bar 100 and coupled by bolt fastening is formed at each of the left and right sides of the rear window frame to thus firstly assemble the rear window frame at the outside of the rear pipe 11b.

The coupling part 120 formed on the door mounting bar 100 is bent several times and comes into close contact with the outer surface and the rear side of the rear pipe 11b while protruding backward. Further, the engagement coupling part 210 of the rear window frame 200 is formed by welding an additional L-shaped bracket at a position corresponding to the coupling part 120 of the door mounting bar 100.

Further, a coupling bracket 300 is tightly in contact with the rear pipe 11b at the inner side that forms a boarding space in the cabin frame 10, and simultaneously connects the door mounting bar 100 and the rear window frame 200, so that the coupling bracket 300 comes into close contact with the door mounting bar 100 and the rear window frame 200 at an inclined surface of the rear pipe 11b formed in a polygonal (square) shape, thus rigidly fastening the same.

In this case, on the other inner side in the opposite direction at which the coupling part 120 of the door mounting bar 100 is not formed, a first assembly 140 assembled with one side of the coupling bracket 300 using a bolt is provided while being in close contact with the front side of the rear pipe 11b. On the other hand, a second assembly 220 assembled with the other side of the coupling bracket 300 using a bolt may be provided at each corner of the inner surface of the rear window frame 200.

Therefore, the door mounting bar 100 and the rear window frame 200 may be simultaneously connected and coupled by: firstly, fastening the coupling part 140 and the engagement coupling part 210 through bolts, wherein these coupling parts are formed in close contact with the outer surface and the inner surface of the rear pipes 11 of the cabin frame 10 formed in a polygonal (square) shape; and then, bringing the coupling bracket 300 into close contact with the rear pipes 11b to be perpendicular to each other in the inner direction of the cabin frame 10, so that a door and a rear window can be assembled with the cabin frame 10 without forming a drill hole for fastening the bolts in the pipe 11 in which electric wirings are embedded.

In this regard, the hinge bracket 130 provided on the door mounting bar 100 is attached to a position corresponding to the hinge 21 of the door 20 by welding and, in order to forma thread 410 of the hinge bracket 400, may be integrally formed with the hinge by machining or integrally mounted while inserting a nut to prevent the hinge bracket from being separated arbitrarily.

Further, a rim of the door 20 is preferably provided with a packing belt to mitigate impact due to opening and closing of the door mounting bar 100, thus eliminating noise or maintaining the door sealed in a closed state.

At this time, a bent portion 111 is formed at a front tip of the hook part 110 of the door mounting bar 100, which was formed to be caught on a top surface of the upper pipe 11a, so as to form a fitting groove 112 which in turn is mounted in a clamping manner at the upper side of the upper pipe 11a, where by the door mounting bar may be easily and firmly assembled with the rear window frame 200 to inhibit the door mounting bar mounted on the cabin frame 10 from being separated arbitrarily.

Further, an adhesive is applied to the inner surface of the door mounting bar 100 to prevent occurrence of Loosening when the door mounting bar is mounted on the rear pipe 11b of the cabin frame 10, thus enabling more solid mounting.

Meanwhile, a vertical bar 400 is installed at an entryway of the cabin frame 10 to be spaced apart by a predetermined width from the upper pipe 11a of the cabin frame 10, so that the door 20 may have a reduced size by a predetermined area due to the vertical bar 400. Therefore, the door 20 may be installed in a manner of eliminating discomfort of the door 20 opened/closed in a hinged door manner and, at the same time, may be provided with a side window 40 to secure the driver's side view.

The vertical bar 400 has a length from the upper pipe 11a of the cabin frame 10 to the bottom surface, wherein a fitting portion 420 is formed at a top end of the vertical bar to be fitted in the bottom direction of the upper pipe 11a, a fixing surface 430 is formed at a bottom end of the vertical bar to be fastened on the bottom surface of the cabin frame 10 by bolt fastening, and a door lock device 410 is provided at one surface on which the door 20 is installed, so as to lock a locking means operated by a handle of the door 20 and thus control opening/closing of the door.

In this regard, the fitting portion 420 formed at the top end of the vertical bar 400 has a projection 421 protruding upward on one side and is provided with a separate assembly 422 assembled at the other side to correspond to the projection 421.

Further, the fixing surface 430 formed at the bottom of the vertical bar 400 consists of a plate having a predetermined area and is formed by welding.

In addition, the fixing surface 430 may be formed with an area to cover a whole bottom surface of the entryway or may be formed by assembling a separate bottom plate 431.

Further, in order to connect the vertical bar to the front pipe 11c of the cabin frame 10, an attachment surface 440 is formed at a lower end side of the vertical bar 400 and is adhered to the front pipe 11c of the cabin frame 10 using silicone, in a state in which the side window 40 is disposed on the other side and the attachment surface 440. Further, in order to support the side window 40 without being separated, the attachment surface 440 is tightly in contact with a front window frame 30 to form a front window by means of a fixing bracket, thereby supporting the same without separation.

On the other hand, the door 20 is provided with a door opening control means 22 to control an opening angle and prevent an occupant from operating the forklift in a state in which the door is opened, thus inhibiting damage caused by impact when the door 20 is opened.

The door opening control means 22 may consist of a band having a predetermined length, wherein both left and right sides of the band, respectively, are fixed to one side of the door and one side of the coupling bracket 300 to connect the door mounting bar 100 and the rear window frame 200. Therefore, when the door is closed, the band is folded. On the contrary, when the door is opened, the band is unfolded to limitedly open the door only by an angle of 90°.

In more detail, fixing means 23, 310 are provided on one side of the door 20 and one side of the coupling bracket 300, respectively, wherein the coupling bracket 300 is connected to the first assembly 130 of the door mounting bar 100. The fixing means 23, 310 are fixed to both left and right sides of the band in the door opening control means 22 so that, depending on opening/closing of the door 20, the door opening control means 20 is folded or unfolded. Therefore, it is possible to limitedly open the door 20 in a radius of about 90° from a closed state, thus preventing damage caused by impact when the door 20 is opened.

In addition, the door opening control means 22 consisting of the band may have a door opening angle which is narrower or wider as a length of the band is shorter or longer, respectively.

At this time, the door 20 may be further provided with a window frame 24 for ventilation of the enclosed space, as well as a window 26 opened/closed by a lever 25a of the locking means 25 on the window frame 24, wherein a locking surface 24a protruding from an inner wall surface of the door 20 is formed on the window frame 24, to which the lever 25a of the locking means 25 is locked. Therefore, opening/closing control is possible without a separate locking element to lock the lever. 25a of the locking means 25 on the window frame 24, thereby accomplishing ease of manufacture.

As described above, the present invention has been described with reference to preferred embodiments of the present invention, however, the present invention is not limited to these embodiments and various alterations and modifications of the embodiments may be possibly embodied within the scope without departing from the technical spirit of the present invention.

The invention claimed is:

1. A forklift cabin door and window frame to be mounted without drilling operation, which are used for mounting a door (20) on a cabin frame (10) of a forklift wherein the cabin frame includes an entryway formed at each of left and right sides of the forklift and composed of a hollow polygonal pipe (11) having a front side, a rear side and an upper end integrally connected together, and wherein electric wirings are embedded in the pipe (11), the forklift cabin door and window frame comprising:

a door mounting bar (100) which is in close contact with an outer surface of a rear pipe (11b) at each of left and right sides of the cabin frame (10), and includes a hook part (110) formed on a top end thereof to be caught on an upper pipe (11a), as well as a coupling part (120) disposed at the rear of the rear pipe (11b);

a rear window frame (200) consisting of a square frame, which is mounted between both left and right rear pipes (11a) at a rear of the cabin frame (10), and includes an engagement coupling part (210) formed at each of left and right sides of the rear window frame in order to be coupled to the coupling part (120) of the door mounting bar (100) by bolt fastening;

a coupling bracket (300) that connects the door mounting bar (100) and the rear window frame (200), which are coupled in close contact with the outer surface of the rear pipe (11*b*), at an inside of the cabin frame (10) simultaneously, in order to prevent the same from being separated from the rear pipe (11*b*); and a door (20) mounted on the door mounting bar (100) to be opened/closed by a hinge (21), wherein a hinge bracket (130) is provided at each of top and bottom ends of the outer surface of the door mounting bar (100), which has a predetermined thickness and is integrally formed with a thread (131) in order to ensure a thread thickness at bolt fastening for assembly of the hinge (21) to open/close the door (20).

2. The door and window frame according to claim 1, wherein a vertical bar (400) having a length from the upper pipe (11*a*) of the cabin frame (10) to a bottom surface is further installed at the entryway of the cabin frame (10) while being spaced apart by a predetermined distance from a front pipe (11*a*), in order to partition the door (20) and a side window (40), thus reducing a size of the door (20) by a predetermined area and ensuring a driver's side view, and the vertical bar (400) is provided with a door lock device (410) to control opening/closing of the door (20).

3. The door and window frame according to claim 2, wherein a fitting part (420) is formed at a top end of the vertical bar (400) to be fitted and coupled to the upper pipe (11*a*), and a fixing surface (430) is formed at a bottom end of the vertical bar (400) to be fixed by bolt fastening.

4. The door and window frame according to claim 2, wherein the door mounting bar (100) is adhered to the rear pipe (11*a*) of the cabin frame (10) while being in close contact with the same, so as to prevent the door mounting bar (100) from being loosened.

5. The door and window frame according to claim 1, wherein the hook part (110) of the door mounting bar (100) further includes a bent portion (111) to be caught on the upper pipe (11*a*) of the cabin frame (10) and thus prevent the door mounting bar (100) from being released.

6. The door and window frame according to claim 1, wherein the door (20) and the door mounting bar (100) are further provided with a door opening control means (22) to control an opening angle of the door (20).

7. The door and window frame according to claim 6, wherein the door opening control means (22) consists of a band having a predetermined length, and both left and right sides of the door opening control means (22) are fixed to fixing means (23), which are formed in the door (20) opened/closed by the hinge (21) and the coupling bracket (300), respectively, so that the door opening control means is folded when the door (20) is closed and is unfolded when the door (20) is opened, thereby controlling the opening angle of the door (20).

8. The door and window frame according to claim 1, wherein a window (26) having a locking means (25) operated by a lever (25*a*) and a square window frame (24) to open/close the window (26) in a sliding manner are provided inside the door (20), and wherein the window frame (24) has a locking surface (24*a*) protruding from an inner wall surface of the door (20), to which the lever (25*a*) of the locking means (25) is locked.

\* \* \* \* \*